United States Patent
Davidson

(10) Patent No.: US 12,259,217 B2
(45) Date of Patent: Mar. 25, 2025

(54) RIFLESCOPE WITH MODULAR DISPLAY ASSEMBLY AND RELATED METHODS

(71) Applicant: GUNWERKS, LLC, Cody, WY (US)

(72) Inventor: Aaron Davidson, Burlington, WY (US)

(73) Assignee: GUNWERKS, LLC, Cody, WY (US)

( * ) Notice: Subject to any disclaimer, the term of this patent is extended or adjusted under 35 U.S.C. 154(b) by 628 days.

(21) Appl. No.: 17/555,860

(22) Filed: Dec. 20, 2021

(65) Prior Publication Data

US 2023/0194206 A1 Jun. 22, 2023

(51) Int. Cl.
| | |
|---|---|
| F41G 1/38 | (2006.01) |
| G02B 23/14 | (2006.01) |
| F41G 1/473 | (2006.01) |
| G02B 27/34 | (2006.01) |
| G02B 27/36 | (2006.01) |

(52) U.S. Cl.
CPC .............. *F41G 1/38* (2013.01); *G02B 23/14* (2013.01); *F41G 1/473* (2013.01); *G02B 27/34* (2013.01); *G02B 27/36* (2013.01)

(58) Field of Classification Search
USPC ........................................................ 359/424
See application file for complete search history.

(56) References Cited

U.S. PATENT DOCUMENTS

| | | | | |
|---|---|---|---|---|
| 8,915,008 | B2* | 12/2014 | Mauricio | F41G 3/326 |
| | | | | 42/111 |
| 10,480,901 | B2* | 11/2019 | Thomas | F41G 1/38 |
| 2002/0191282 | A1* | 12/2002 | Edwards | F41G 1/38 |
| | | | | 359/405 |
| 2015/0247702 | A1 | 9/2015 | Davidson et al. | |
| 2016/0216068 | A1* | 7/2016 | Hancosky | F41G 1/345 |
| 2017/0241742 | A1* | 8/2017 | Davidson | H01M 50/213 |
| 2018/0224241 | A1* | 8/2018 | Havens | F41G 1/383 |
| 2018/0252500 | A1* | 9/2018 | Maryfield | F41G 1/38 |
| 2019/0072754 | A1* | 3/2019 | Lv | G02B 23/105 |

\* cited by examiner

*Primary Examiner* — Wyatt A Stoffa
*Assistant Examiner* — Seth D Moser
(74) *Attorney, Agent, or Firm* — DORSEY & WHITNEY LLP

(57) ABSTRACT

A modular display assembly for riflescopes and related methods are provided. In one example, a modular display assembly includes a housing, a control module, and a reflective element. The control module can be operably coupled to the housing and include a substrate and display. The display can be coupled to the substrate and configured to emit light onto the reflective element. At least a portion of the housing is configured to be removably inserted into the riflescope. The modular display assembly can include a user interface that receives user input. The user input can vary information displayed on the display and reflected from the reflective element. One or more alignment pins can engage the substrate and, when rotated, shift the position of the display relative to the reflective element.

20 Claims, 11 Drawing Sheets

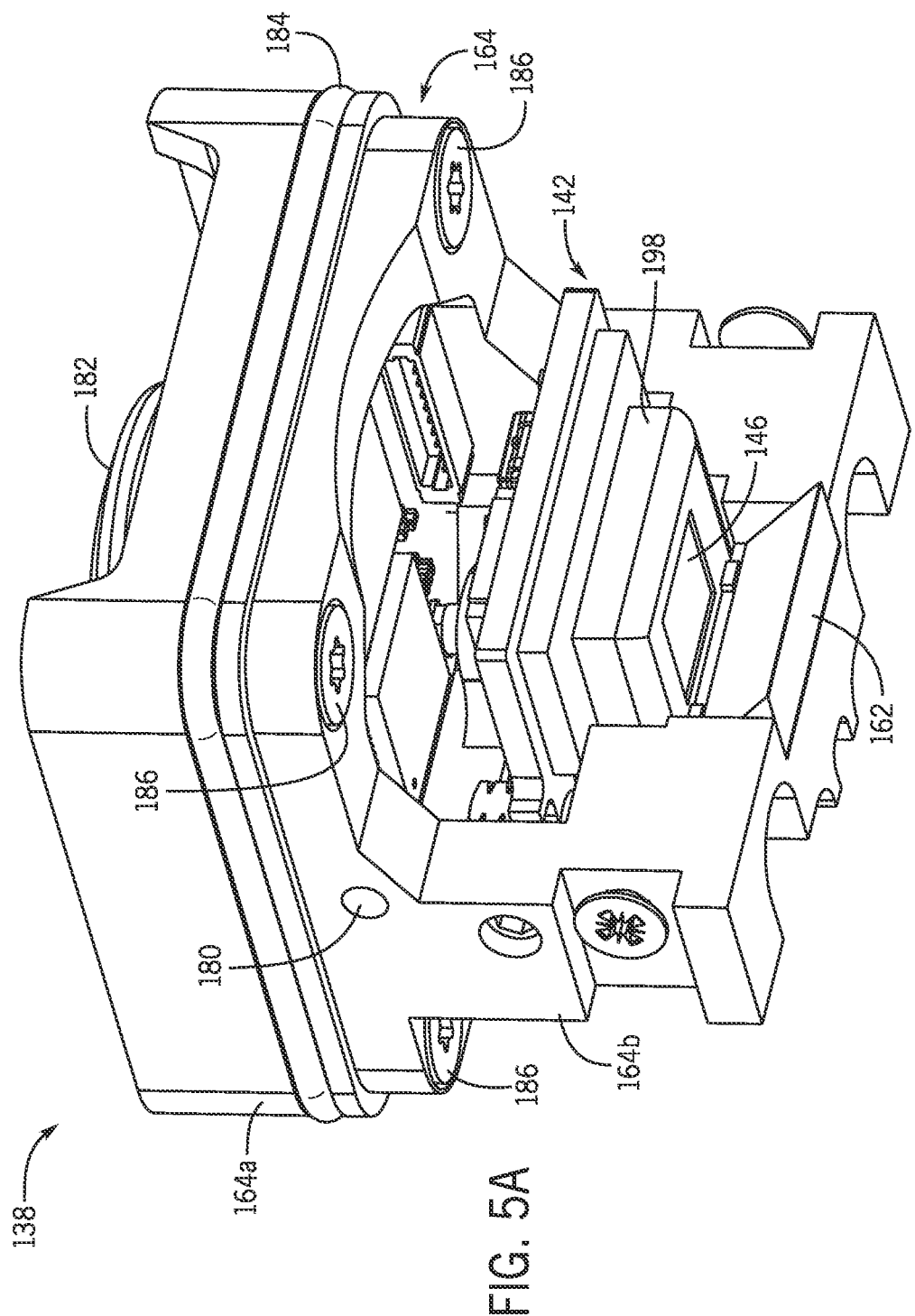

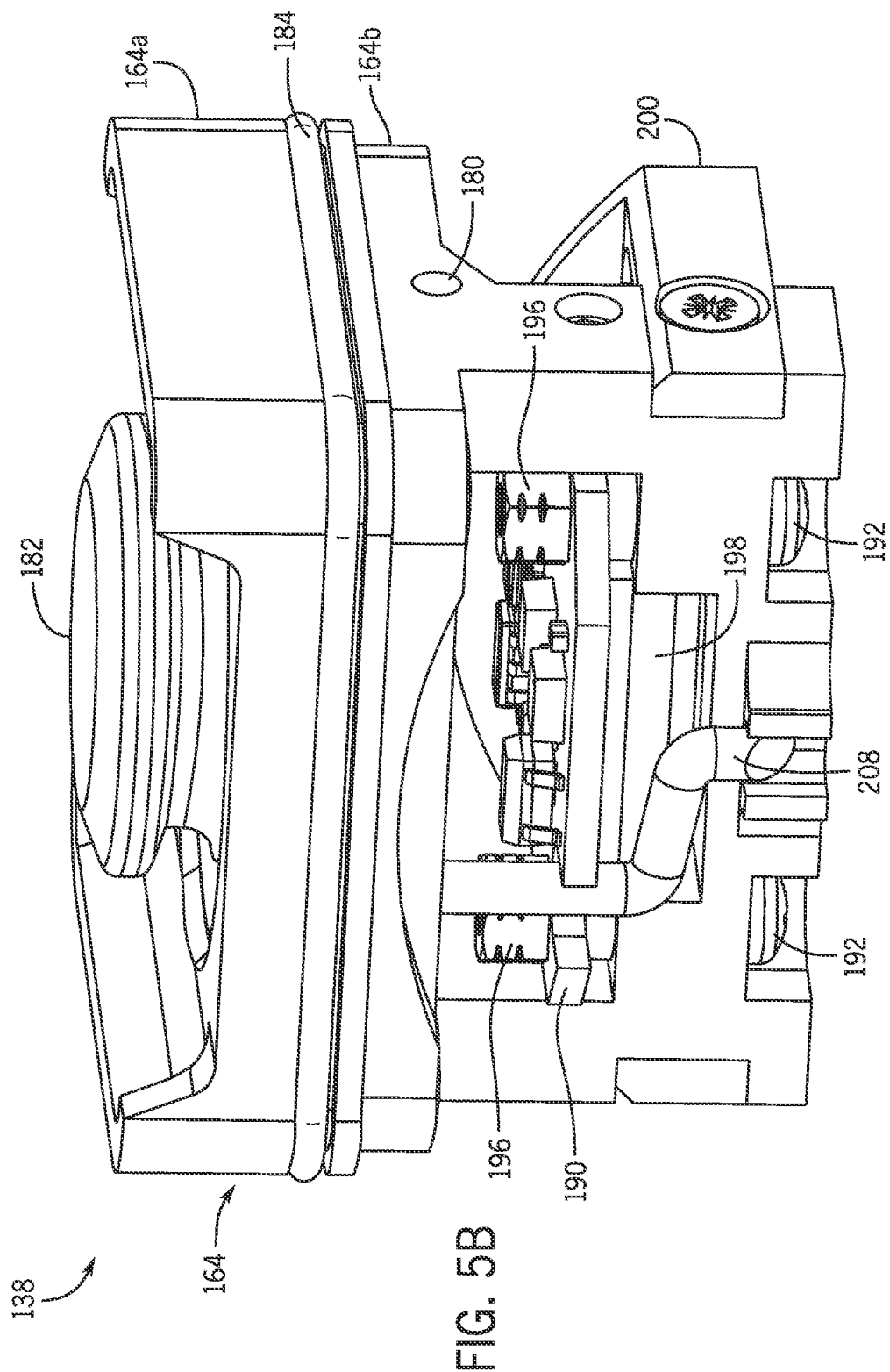

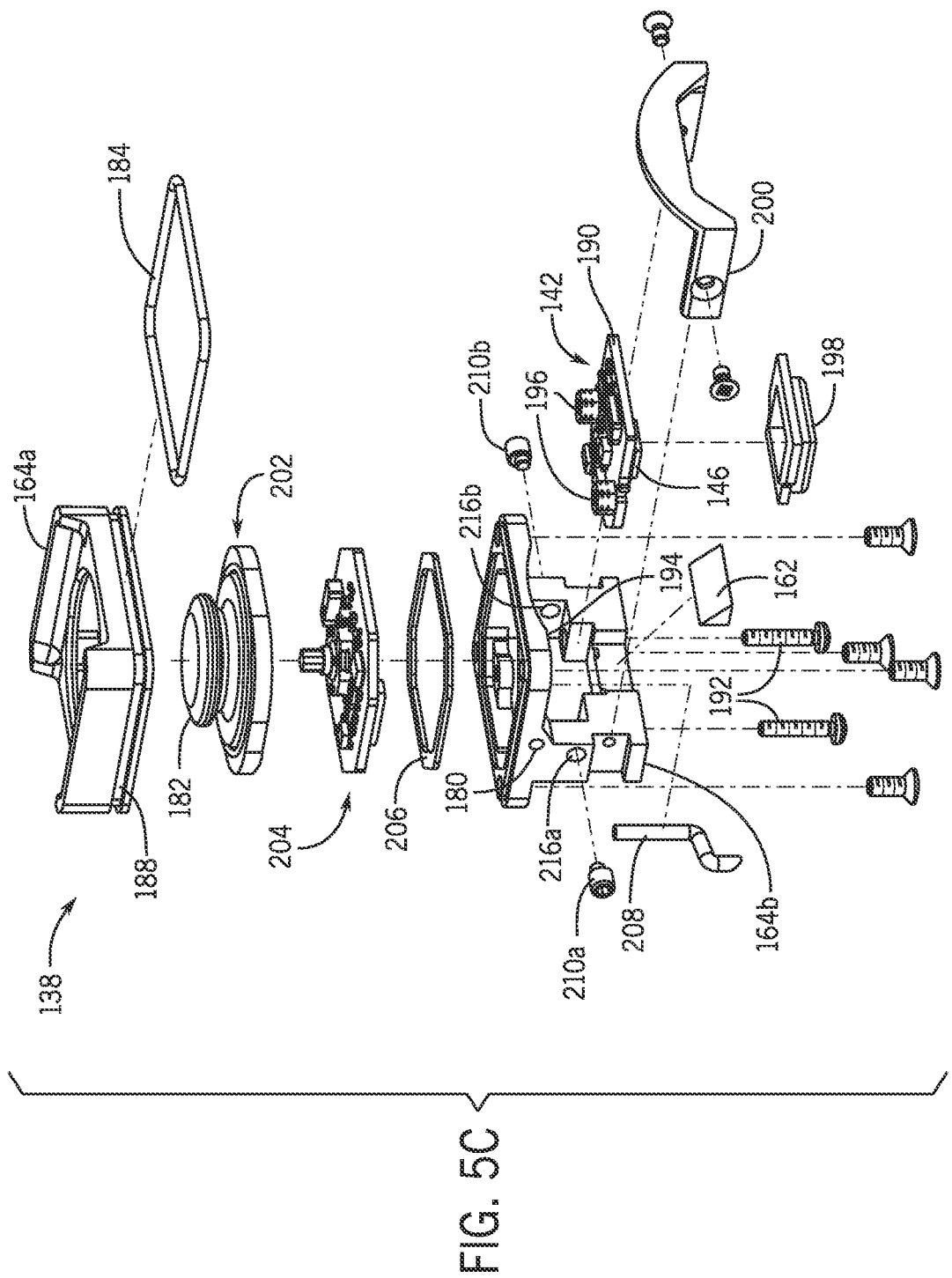

RIFLESCOPE WITH MODULAR DISPLAY ASSEMBLY AND RELATED METHODS

BACKGROUND

Firearms such as rifles are used for a variety of purposes, including for sport, military and other protective services. Oftentimes, rifles are used to shoot targets at long distances (e.g., 100 yards or more) and even very long ranges (e.g., in excess of 500 yards). In order to accommodate the sighting of a target at such ranges, riflescopes are often employed. A riflescope includes optics that magnify the view of the target and also help to aim the rifle for purposes of accuracy and precision. For example, a riflescope may include a reticle or other aiming point positioned in the field of view that is provided by the optics of the riflescope, the aiming point being aligned with a target by a user prior to firing the rifle.

Factors such as bullet drop (i.e., the influence of gravity on a moving bullet), the Magnus Effect, the Coriolis Effect, ballistics specific considerations, as well as other factors may impact the path of a bullet when fired over relatively long distances. Thus, the ability to compensate for these factors by positioning the aiming point of the riflescope has been an important aspect in long range shooting.

Through the development of new technologies, riflescopes have become more and more sophisticated and have incorporated various electronic components into their designs. For example, U.S. Patent Publication No. 2015/0247702, the disclosure of which is incorporated by reference herein, describes a riflescope having various components such as a processor, memory, a feedback display, one or more sensors, and a variety of other components including input and output devices.

Like any other product, riflescopes can require maintenance to clean, repair, adjust, or replace underperforming or damaged components. Maintenance of such components within a riflescope can be time consuming, requiring a skilled technician to disassemble a substantial portion of the riflescope, replace or refurbish one or more components, and reassemble the riflescope. Such a process can be labor intensive and therefore deprive the owner from using the riflescope for a significant period of time. As riflescopes are used on weapons for sport, military, and protective services, depriving an owner from using the riflescope can bear a significant cost and burden on the owner.

BRIEF SUMMARY OF THE INVENTION

Embodiments of the present disclosure provide optical devices, such as a riflescope, having one or more modular display assemblies.

In accordance with an aspect of the present disclosure, a riflescope is provided including a main tube, an ocular system, an objective system, and a modular display assembly. The ocular system is coupled to a first end of the main tube. The objective system is coupled to a second end of the main tube. The ocular system can include a receiving structure. The receiving structure can form an aperture. At least one focal plane is defined by the main tube, objective system, and ocular system. The modular display assembly can include a housing, a control module, a user interface, and a reflective element. The control module can be operably coupled to the housing. The control module can include a substrate and a display. The display is configured to emit light. The reflective element can be positioned between the focal plane and the ocular system. The reflective element can reflect at least a portion of light emitted from the display. The modular display assembly can be releasably received within the aperture of the receiving structure.

In some embodiments, the user interface can receive input from a user of the riflescope. The input received at the user interface can vary an indicia defined by the light emitted from the display. The riflescope can include a reticle having a horizontal marking defining a plane that bisects the riflescope. The reflective element can be positioned on one side of the plane defined by the horizontal marking. The riflescope can include a processor and memory. The processor can be in electrical communication with the display.

In some embodiments, the display is at least one of an liquid crystal display (LCD), light-emitting diodes (LED), quantum light-emitting diodes (QLED), organic light-emitting diodes (OLED) an e-ink display, a plasma display, a segment display, an electroluminescent display, a surface-conduction electron-emitter display, or a quantum dot display. The riflescope can include a power source to provide electrical power to at least the modular display assembly. The riflescope can include a seal positioned between the modular display assembly and the riflescope, the seal being configured to prevent ingress of contaminants into the riflescope. In some embodiments, the modular display assembly can include a set of alignment pins. The set of alignment pins can extend through a portion of the housing and engage the substrate. Rotation of each alignment pin of the set of alignment pins can cause the substrate to move relative to the reflective element.

In accordance with another aspect of the disclosure, a modular display assembly for a riflescope is provided. The modular display assembly comprises a housing, a control module, a user interface, and a reflective element. The control module can be operably coupled to the housing. The control module includes a substrate and a display. The display is configured to emit light. The reflective element can reflect at least a portion of light emitted from the display. At least a portion of the housing can be removably inserted into the riflescope.

In some embodiments, the user interface can include an input/output device and a controller. The input/output device can be at least partially positioned within an opening defined by the housing. The controller is operably coupled to the input/output device. The controller can recognize input received at the input/output device. The input received at the input/output device can vary a displayed content defined by the light emitted from the display. The input/output device can include at least one of a joystick, a button, a switch, or a knob.

In some embodiments, the housing includes a first portion and a second portion which are separable from one another. The modular display assembly can be removable from the riflescope. The substrate can include a printed circuit board that communicatively couples the display to a processor. In some embodiments the modular display assembly can include a seal positioned between the housing and the riflescope, the seal being configured to prevent ingress of contaminants from entering the riflescope.

In one embodiment, the reflective element can be a mirror or prism having a surface oriented at an angle of approximately 45° relative to light emitted from the display. In some embodiments, the modular display assembly can include a set of alignment pins. The set of alignment pins can extend through a portion of the housing and engage the substrate. Rotation of each alignment pin of the set of alignment pins can cause the substrate to move relative to the reflective element. Light emitted from the display can form an indicia defining information. The information can be viewed by a user of the riflescope at the reflective element. The control module can include a processor and a memory storage. The memory storage can store a plurality of operational programs. The processor can execute the plurality of operational programs when an input is received at the input/output device.

In accordance with another aspect of the present disclosure, a riflescope is provided including a main tube, an objective system coupled to a first end of the main tube, an ocular system coupled to a second end of the main tube, and a modular display assembly. The ocular system can include an outer casing that defines a cavity within the ocular system. The main tube, the objective system, and the ocular system can define at least one focal plane. The modular display assembly can include a housing, a control module, a user interface, and a display. The control module can be operably coupled to the housing. The control module can include a processor. The user interface can be configured to receive input from a user of the riflescope. The display can be communicatively coupled to the processor. The display can emit light forming indicia. The modular display assembly can be received within an aperture formed within the outer casing of the ocular system. At least a portion of the modular display assembly can extend into the cavity when the display assembly is received within the aperture.

Features, components, steps or aspects of one embodiment described herein may be combined with features, components, steps or aspects of other embodiments without limitation.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 5A is a perspective view of a modular display assembly of a riflescope according to an embodiment of the present disclosure;

FIG. 5B is another perspective view of the modular display assembly shown in FIG. 5A according to an embodiment of the present disclosure;

FIG. 5C is an exploded perspective view of the modular display assembly of FIG. 5A according to an embodiment of the present disclosure;

DETAILED DESCRIPTION OF THE INVENTION

Embodiments of optics equipment, such as a riflescope, along with related components, systems, and methods are provided herein. According to various embodiments, a riflescope may have one or more modular display assemblies, each assembly including a housing and a control module. The housing can act as a frame or mounting surface for other components of the modular display assembly. The housing interfaces with the riflescope by sliding at least partially within an aperture of a receiving structure of the riflescope. The housing is releasably retained within the receiving structure such that the modular display assembly can be removed from the riflescope to quickly and easily access components of the modular display assembly. For example, a pair of setscrews or other retaining mechanisms or structure can engage the housing to retain the modular display assembly within the receiving structure of the riflescope. When the setscrews are removed or loosened, however, the modular display assembly can be removed from the aperture of the receiving structure without requiring additional deconstruction of the riflescope or otherwise destructive actions being taken relative to various components.

The control module can be coupled to the housing. The control module can include a substrate and display. The display is positioned such that light emitted from the display is visible to a user of the riflescope. For example, light emitted from the display can form indicia and thereby provide displayed content (e.g., information) to a user of the riflescope. In some embodiments, the user can directly view the display within an ocular system of the riflescope. In other embodiments, the user can indirectly view light emitted from the display on a reflective element (e.g., a mirror, prism, etc.) positioned within the riflescope.

Quick and easy removal of the modular display assembly is advantageous, for example, by reducing the time required to repair or upgrade components of the modular display assembly. For instance, if the modular display assembly of the riflescope is accidentally damaged, malfunctions, or becomes out of tolerance, the owner of the riflescope (or another party) can simply and easily replace the modular display assembly without removing turrets, lenses, or other components of the riflescope to gain access to the modular display assembly.

Another aspect of the present disclosure relates to aligning components of the modular display assembly (e.g., aligning the display with the reflective element). In some embodiments, the control module can include a substrate that is movable within the housing to align the display with the reflective element. For example, a set of alignment pins can be positioned within the riflescope and engage the substrate such that rotation of one or both of the pins cause the substrate to move relative to the housing and the reflective element.

Figure 1:
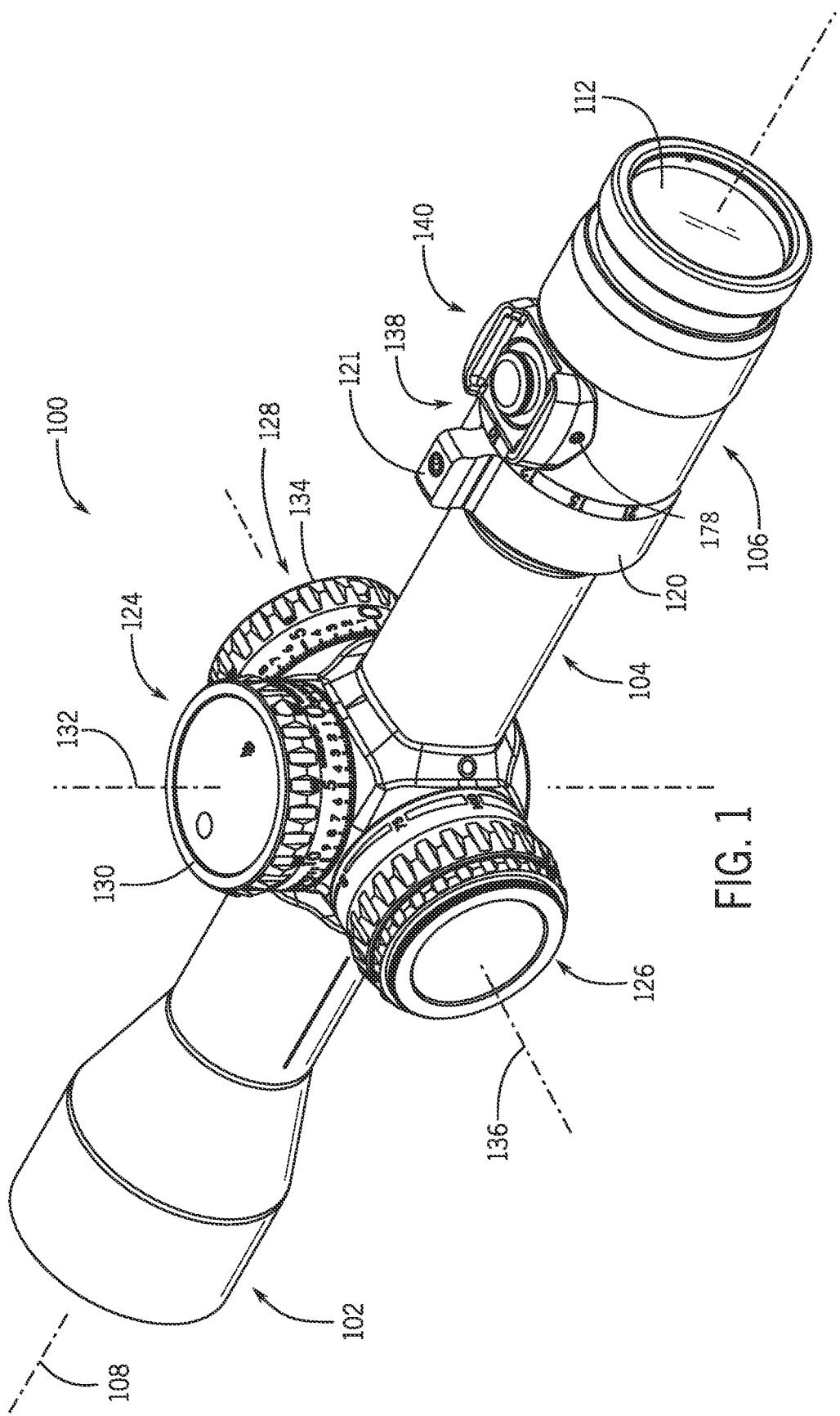
FIG. 1 is a perspective view of a riflescope according to an embodiment of the disclosure.

Referring to FIG. 1, a riflescope 100 is shown in accordance with an embodiment of the present disclosure. The riflescope 100 may include an objective system 102, a main tube 104, and an ocular system 106 arranged along an optical axis 108. The objective system 102 may include one or more lenses (not shown) and is positioned at the distal end of the riflescope 100 (i.e., the farthest away from a user's eye during use). The ocular system 106 also may include one or more lenses 112 and may be located at a proximal end of the riflescope 100. A plurality of optical elements may also be disposed within the main tube 104. For example, an erector system, including an erector tube and various lenses or other optical elements, may be contained within the main tube 104 to invert the image so that a user sees the image in a "right side up" orientation when looking through the riflescope 100. A magnification ring 120 (also referred to as a power ring) may be used to vary the magnification of the image being viewed though riflescope by adjusting the relative position of various optical elements disposed within the riflescope 100. The magnification ring 120 can include a protrusion or knob 121 that allows a user to more easily rotate the magnification ring 120.

Various lenses, tubes, mechanical components, and electronic components may also be incorporated with or utilized in conjunction with the riflescope including, for example, various sensors, communications devices, input/output devices, etc. Non-limiting examples of electronic components and systems incorporated into or otherwise utilized with a riflescope are described U.S. Patent Application Publication No. 2015/0247702, published Sep. 3, 2015 and U.S. Pat. No. 10,480,901, granted Nov. 19, 2019, the disclosures of which are hereby incorporated by reference in their entireties.

The riflescope 100 may also include a number of adjustment mechanisms including, for example, an elevation adjustment assembly 124, a parallax dial assembly 126, and a windage adjustment assembly 128. The elevation adjustment assembly 124, parallax dial assembly 126, and windage adjustment assembly 128 may each be referred to as turrets. The elevation adjustment assembly 124 may be used to adjust the vertical position of a reticle (e.g., reticle 152 of FIG. 3) within the body of the riflescope 100 by rotation of the associated knob 130 relative to the main tube 104 about a rotational axis 132. Likewise, the windage adjustment assembly 128 may be used to adjust the horizontal position of reticle within the body of the riflescope by rotation of an associated knob 134 relative to the main tube 104 about a rotational axis 136. The parallax dial assembly 126 may be used to adjust target focus and/or correct parallax (e.g., such as by repositioning a focus lens) by rotation about the rotational axis 136. The optical axis 108 and the two rotational axes 132 and 136 may be oriented orthogonally with respect to each other.

The riflescope 100 includes a modular display assembly 138. The modular display assembly 138 can be positioned, at least partially, within a receiving structure 140 on the riflescope 100. For example, as shown in FIG. 1, the modular display assembly 138 can be positioned within a receiving structure 140 formed on or in the ocular system 106. In some embodiments, the modular display assembly 138 can be removed from the riflescope 100 to enable a user to modify, replace, update, or repair the modular display assembly without requiring the user to remove additional components of the riflescope 100 or disassemble components that may have been assembled using adhesive or material joining techniques. For example, one or more setscrews 178 associated with the ocular system 106 can be loosened or removed to enable the modular display assembly 138 to slide out of the receiving structure 140. As such, various other components of the riflescope (turrets, lenses, etc.) can remain in place and unaltered while the modular display assembly 138 is removed. Similarly, the modular display assembly 138 (or a replacement display assembly) can be returned to the receiving structure 140 of the riflescope 100 without removing or adjusting other components of the riflescope 100.

Figure 2:
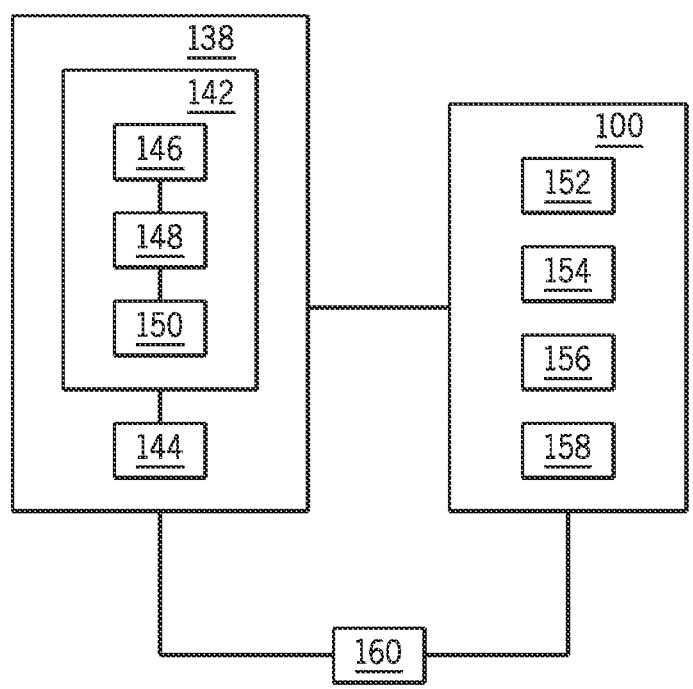
FIG. 2 is a block diagram of various electronic components of the riflescope according to an embodiment of the disclosure.

FIG. 2 shows a block diagram depicting various components that may be utilized in the modular display assembly 138 and/or the riflescope 100 according to an embodiment of the present disclosure. As shown in the block diagram of FIG. 2, the modular display assembly 138 and the riflescope 100 (and their respective components) can be communicatively coupled to one another. The modular display assembly 138 can include a control module 142 and a user interface 144. The control module 142 can include, for example, a display 146, a processor 148, and memory 150. The riflescope 100 can include, for example, a reticle 152 (which may include an illuminated reticle), an encoder 154, a processor 156, and one or more sensors 158. Each of the modular display assembly 138 and the riflescope 100 can be coupled to a power source 160. Alternatively, the modular display assembly 138 and the riflescope 100 can include independent and respective power sources.

As will be discussed below, the display 146 can be physically coupled or affixed to the control module 142. The display 146 can include a liquid crystal display (LCD), light-emitting diodes (LED), quantum light-emitting diodes (QLED) display, or organic light-emitting diodes (OLED), an e-ink display, a plasma display, a segment display, an electroluminescent display, a surface-conduction electron-emitter display, a quantum dot display, etc. In some embodiments, the display 146 can be dimmed or darkened to aid the user in viewing the target and/or to save power. The display 146 may be dimmed, for example, in response to a button being pressed by the user or other input provided through the user interface 144. Alternatively, the display 146 may only be active in response to a button press.

As such, the display 146 can emit light that forms or defines an indicia or an image. The indicia can represent display content or information such as letters, numbers, video or other representations, or any other symbols arranged such that the user of the riflescope 100 can recognize the information (shown as text "550" and "1.0" in FIG. 3). The information presented to the user can represent, for example, elevation hold data, windage hold data, current vertical adjustment data, current horizontal adjustment data, wind compensation data, line of sight data, horizontal equivalent distance data, environmental condition data, temperature data, atmospheric pressure data, wind speed data, degrees of inclination data, cant correction data, left or right pitching of the rifle data, humidity data, battery power data, system status information, ballistic information, compass bearing, GPS coordinates, etc. Various other information may be presented to the user through the display 146 including infrared imaging, video imaging of a different field of view than what is presented through the live view of the riflescope 100, or any other appropriate information.

The modular display assembly processor 148 can be any type of processor known in the art that may receive inputs, execute algorithms and/or processes, and may include, without limitation, one or more general-purpose processors and/or one or more special-purpose processors (such as digital signal processing chips, graphics acceleration chips, and/or the like). The processor 148 can be used to control various processes, algorithms, and/or methods in the operation of the modular display assembly 138. The processor 148 can control operation of a display 146. The processor 148 can also receive inputs from the user interface 144, the memory 150, and/or from other sources.

The memory 150 may include any type of digital data storage such as such as random access memory ("RAM") and/or read-only memory ("ROM"), which can be programmable, flash-updateable, and/or the like. In other embodiments, the memory may include memory from an externally connected device including, for example, a disk drive, a drive array, an optical storage device, or a solid-state storage device. In some embodiments, the memory 150 may be configured to store ballistic information that includes data that can be used, for example, to correct for the amount a bullet may drop over a given distance and/or the horizontal deflection of the bullet.

The memory 150 include one or more operational programs stored therein for operating the modular display assembly 138 and the riflescope 100. The one or more operational programs include machine readable and executable instructions to control output parameters and characteristics of at least one of the display 146, the modular display assembly processor 148, the user interface 144, the reticle 152, the encoder 154, the riflescope processor 156, the sensor(s) 158, and the power source 160. Accordingly, the processors 148, 156 selectively control the output of one or more of the components of the riflescope 100 (including the modular display assembly 138) responsive to an operational program of the stored operational programs. In some embodiments, the riflescope 100 can include an independent memory (not shown) communicatively coupled to the riflescope processor 156. The independent memory of the riflescope 100 can store operational programs that relate to operation of the components of the riflescope 100.

The user interface 144 may include or otherwise be associated with a plurality of input and/or output devices such as joysticks, buttons, keys, knobs, touchscreens, displays, speakers, microphones, etc. For example, the user interface 144 can include or interact with a joystick or pointing device (see joystick 182 in FIG. 4A) that can receive directional input (e.g., leaning the joystick in any number of radial directions) from a user of the riflescope. Such an input device may, for example, be positioned within an opening defined by the housing 164. Such input devices or mechanisms can enable a user of the riflescope to scroll through a menu or otherwise manipulate a function of the modular display assembly 138.

Some aspects of the user interface 144 such as, for example, buttons or a joystick, may be used to manually enter data such as, for example, wind data, display intensity data, reticle intensity data, ballistic profile data, ballistic coefficient data, muzzle velocity data, primary zero data, static conditions of the rifle-scope system, GPS coordinate data, compass coordinate data, sight-above-bore data, etc. This data may be received by the processor 148 from sensors or other devices and saved into the memory 150. The data may also be used by the processor 148 in an algorithm or to execute an algorithm.

In some embodiments, a component of the modular display assembly 138, such as the user interface 144, can send data to and receive data from an external electronic device (e.g., a smart phone, laptop, tablet computing device, etc.). The external electronic device may include wired or wireless communications devices and/or may include any type of data transfer technology such as, for example, a USB port, a mini USB port, a memory card slot (e.g., a microSD slot), NFC transceiver, Bluetooth® transceiver, Firewire, a ZigBee® transceiver, a Wi-Fi transceiver, an 802.6 device (i.e., a device compliant with the IEEE 802.6 standard), cellular communication devices, and the like.

The power source 160 may be connected to the modular display assembly 138 and/or the riflescope 100. In some embodiments, a single power source can be directly coupled to one or more components described herein (e.g., the reticle 152, the encoder 154, the display 146, the controller 142, the user interface 144, etc.). The power source 160 can include a battery or other power storage device operable to store a sufficient quantity of electrical power to operate the modular display assembly 138 and the riflescope 100. The battery can be any type of battery power source without limitation (e.g., lithium-ion, capacitive, rechargeable, solar, other power sources, or combinations thereof).

The reticle 152 can be constructed from optical material, such as optical glass or plastic or similar transparent material, and/or may take the form of a disc or wafer with substantially parallel sides. The reticle 152 can, for example, be constructed from wire, nano-wires, an etching, or may be analog or digitally printed, or may be projected (for example, on a surface) by, for example, a mirror, video, holographic projection, or other suitable means on one or more wafers of material. In some embodiments, the reticle 152 can include an illuminated reticle. An illuminated reticle can be etched into an optical surface, the etching being backfilled in with a reflective material such as, for example, titanium oxide, that illuminates when a light or diode powered by, for example, a battery, chemical, or photovoltaic source, is rheostatically switched on.

Each of the assemblies 124, 126, 128 can include an encoder 154. Each encoder 154 can provide position data relative to a rotational position of the respective assembly 124, 126, 128 (e.g., adjustment turrets) as is described in U.S. patent application Ser. No. 14/326,350 (published as U.S. Patent Publication No. 2015/0247702), the disclosure of which is incorporated by reference herein in its entirety.

The riflescope processor 156 may be any type of processor known in the art that may receive inputs, execute algorithms and/or processes, and may include, without limitation, one or more general-purpose processors and/or one or more special-purpose processors (such as digital signal processing chips, graphics acceleration chips, and/or the like). The processor 156 can be used to control various processes, algorithms, and/or methods in the operation of the riflescope 100. The processor 156 can control operation of the reticle (see reticle 152 of FIG. 3) of the riflescope 100. The processor 156 can also receive inputs from the sensor(s) 158, the encoder 154 associated with the position of an adjustable component (e.g., the vertical adjustment knob 130, the windage adjustment knob 134 or the parallax dial 132), and/or from other sources.

The one or more sensors 158 may be used to sense any of a variety of environmental conditions or characteristics associated with the use of the riflescope 100. For example, the sensor(s) 158 may sense atmospheric conditions (such as humidity, temperature, pressure, etc.), inclination, rifle cant, and/or the sight direction of the rifle (compass direction). While a single sensor is shown, any number of sensors may be included. Sensor data may be recorded by the processor 156 (and saved into a memory) and/or used in the processing of instructions for operation of the riflescope 100.

Figure 3:
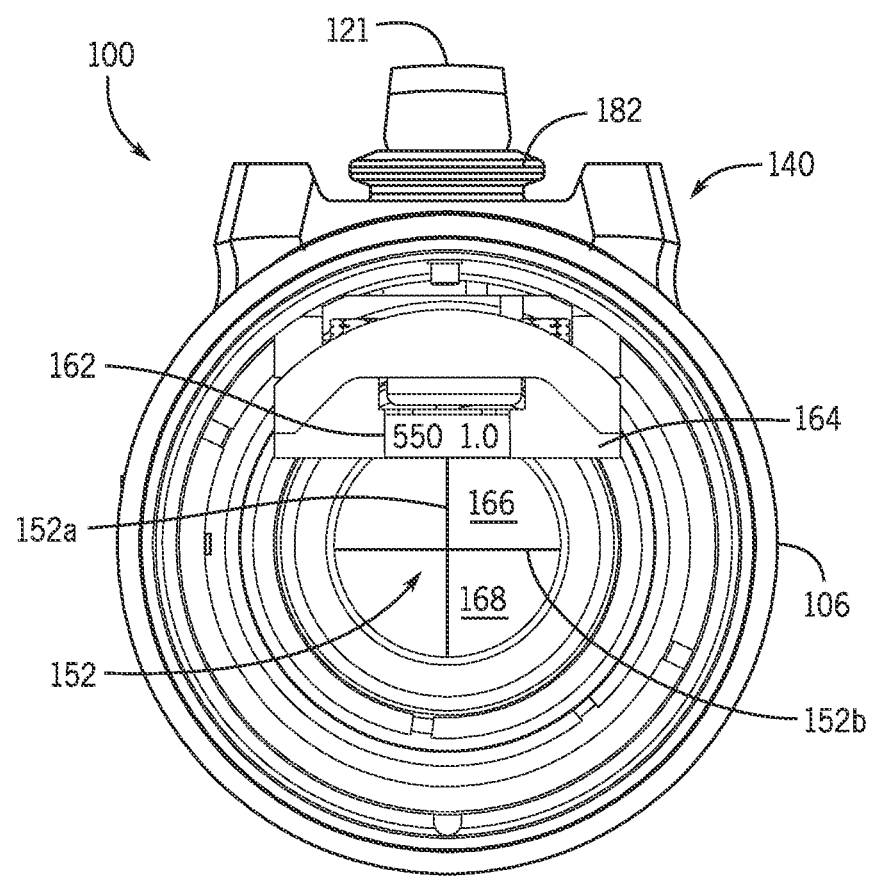
FIG. 3 is a rear view of the riflescope shown in FIG. 1 looking through an ocular end of the riflescope.

Referring now to FIG. 3, a view looking through the riflescope 100 from the ocular end is presented. The modular display assembly 138 includes a reflective element 162. The reflective element 162 can be affixed to a housing 164 of the modular display assembly 138. While the modular display assembly 138 is positioned within the receiving structure 140 of the riflescope 100, the reflective element 162 is positioned such that the reflective element 162 can be viewed by a user looking through the riflescope 100.

The reflective element 162 can be positioned relative to the display 146 such that light emitted from the display 146 is at least partially reflected by the reflective element 162. Light reflected by the reflective element 162 can be visible to a user looking through the riflescope 100. The reflective element 162 can be a mirror, prism, beam splitter, polished metal, or any other reflective or semi-reflective surface capable of reflecting at least a portion of the light emitted from the display 146. In some embodiments, the reflective element 162 can be partially or wholly transparent. For example, the reflective element 162 can be a prism which reflects a portion of light emitted from the display 146 but otherwise appears transparent to a user looking through the riflescope 100. In some embodiments, the reflective element 162 can have a film or coating deposited onto the reflective element 162 which reflects one or more wavelengths of light. At least during the time when reflecting light from the display 146, the reflective element 162 may occlude a portion of a live view that is presented from the objective system 102 and through the main tube 104, and which would otherwise be unobstructedly presented through the ocular system 106 were it not for the presence of the display 146. In some embodiments, the display only occludes a portion (e.g., only a minority) of the live view presented from the objective system 102.

The reticle 152 within the riflescope 100 can define one or more vertical markings 152a and one or more horizontal markings 152b. The reflective element 162 of the modular display assembly 138 can be positioned relative to the vertical and horizontal markings 152a, 152b of the reticle 152. For example, the vertical and horizontal markings 152a, 152b shown in FIG. 3 can form respective planes which bisect the riflescope 100, wherein the horizontal marking 152b defines a first region 166 (i.e., a region above the horizontal marking 152b) and a second region 168 (i.e., a region below the horizontal marking 152b). The vertical marking 152a can define similar regions to each side of the vertical marking 152a (e.g., right and left halves). In the embodiment shown in FIG. 3, the reflective element 162 is positioned within (but does not necessarily fill the entirety of) the first region 166, or upper half, defined by the horizontal marking 152b. However, the reflective element 162 can be positioned in one or more of the regions defined by the vertical and horizontal markings 152a, 152b in other embodiments.

In some embodiments, the reflective element 162 can be omitted. In these embodiments, the display 146 can be positioned within direct view of the user while the user is looking through the riflescope 100. For example, the display 146 can be coupled to the housing 164 of the modular display assembly 138 such that a viewing plane of the display 146 is substantially perpendicular to the optical axis 108 and at least partially visible to a user when the user is looking into the ocular system 106 of the riflescope 100.

Figure 4A:
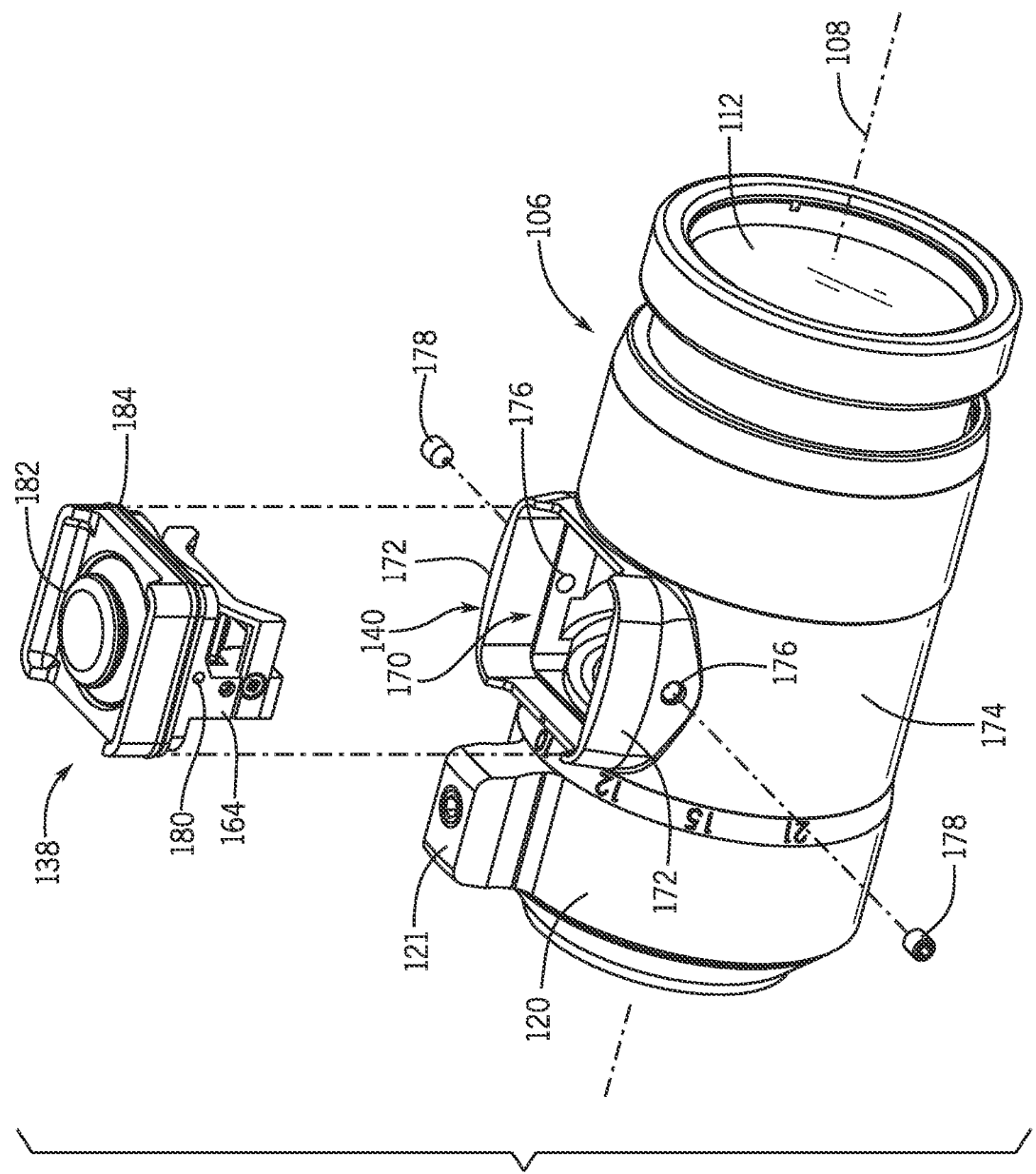
FIG. 4A is a perspective and partially exploded view of a portion of the riflescope shown in FIG. 1.

FIG. 4A shows a perspective and partially exploded view of the ocular system 106 shown in FIG. 1 according to an embodiment of the present disclosure. The receiving structure 140 can form an opening or an aperture 170 within the casing or housing 164 of the ocular system 106. The aperture 170 can be substantially equivalent in size and shape to a footprint or cross-sectional profile of the housing 164 of the modular display assembly 138, such that the housing 164 is at least partially receivable within the aperture 170. As shown in FIG. 4A, the aperture 170 may be generally square or rectangular and, therefore, may substantially parallel the square or rectangular cross-section or footprint of the housing 164 of the modular display assembly 138. Although a square or rectangular aperture and housing cross-section are shown in FIG. 4A, a round, ellipsoidal, hexagonal, triangular, or other such geometrically corresponding apertures and housing cross-sections are contemplated by this disclosure.

When the modular display assembly 138 is removed from the riflescope 100, the modular display assembly 138 can still function or otherwise operate as if in the riflescope 100. In other words, the modular display assembly 138 can operate independent of the riflescope 100 in some embodiments. Independent operation can allow a user or technician to repair, customize, perform maintenance, operate the user interface 144, or otherwise modify the components of the modular display assembly 138. For example, a cap or plug (not shown) may be positioned over or within the aperture 170 and the riflescope 100 may be operated without a display assembly 138. Similarly, when the modular display assembly 138 is removed from the riflescope 100, a user or technician can modify display settings, manage data, reconfigure operating parameters of the modular display assembly 138, update programming instructions of the modular display assembly 138 or otherwise operate or work on the modular display assembly 138.

In some embodiments, the receiving structure 140 can include one or more walls 172 protruding from an outer casing 174 of the ocular system 106. The outer casing 174 defining a cavity within the ocular system 106. The one or more walls 172 can extend or protrude from the outer casing 174 to various heights. For example, one or more of the walls 172 can be recessed relative to one or more of the other walls in order to provide the user a less obstructed view of components of the modular display assembly 138 and riflescope 100 (e.g., the joystick 182, the knob 121 of the magnification ring 120, the adjustment assembly 124, etc.). The one or more walls 172 of the receiving structure 140 can include features that retain the modular display assembly 138 within the receiving structure 140. For example, the one or more walls 172 can include one or more through-holes 176. Each of the through-holes 176 can threadably receive a respective setscrew 178. When received within one of the through-holes 176, the setscrews 178 can engage a recess or opening 180 within the housing 164 of the modular display assembly 138 to releasably retain the modular display assembly 138 within the receiving structure 140. In other embodiments, the outer casing 174 of the ocular system 106 can omit the walls 172 around the aperture 170.

The modular display assembly 138 can include a seal 184 at least partially positioned around, and in one embodiment, completely around, a periphery of the housing 164 to prevent ingress of liquid, dirt, dust, or any other contaminants into the riflescope 100. The seal 184 can be retained within a slot, groove or channel 188 extending around a periphery of the housing 164. When the modular display assembly 138 is inserted into the aperture 170, the seal 184 can contact one or more of the walls 172 to provide a desired level of sealing (e.g., fluid tight or substantially fluid tight) barrier to liquids, gases, particulates or other contaminants entering the riflescope 100 through the aperture 170. The seal 184 can be made of a polymer, such as, a polyurethane or polytetrafluoroethylene. The seal 184 can include material property characteristics beneficial for preventing contaminant ingress into the riflescope 100. For example, the seal 184 can be hydrophobic, hydrophilic, fluid impermeable, resistant to oxidization, resistant to ultraviolet light degradation, elastic, and/or other material characteristic beneficial for a seal.

Figure 4B:
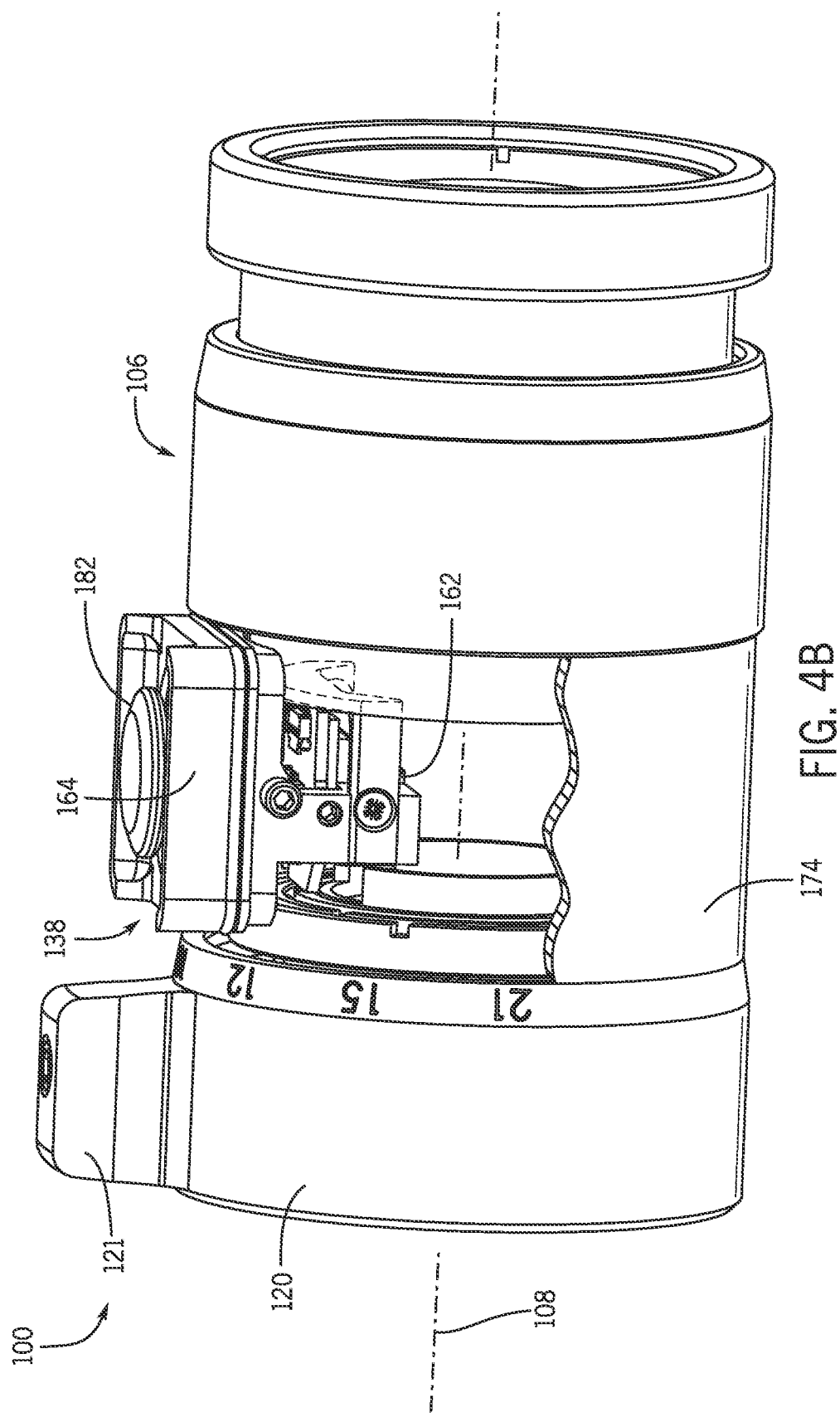
FIG. 4B is a partial cross-section side view of an ocular system of the riflescope illustrated in FIG. 1.

FIG. 4B shows a partial cross-section side view of the ocular system 106 of the riflescope 100 illustrated in FIG. 1, according to an embodiment of the present disclosure. As shown in FIG. 4B, at least a portion of the housing 164 is received within the aperture 170 formed within the outer casing 174 of the ocular system 106 while the modular display assembly 138 is positioned in the riflescope 100. While the housing 138 is at least partially positioned within the receiving structure 140 of the ocular system 106, one or more of the components of the modular display assembly 138 can be positioned within the outer casing 174 of the ocular system 106. For example, at least one of the display 146, the processor 148, the memory 150, the power source 160, or the reflective element 162 can be positioned within the outer casing 174 in order to provide a desired operation, for purposes of ergonomics, and/or to limit exposing the components to environmental conditions (rain, sleet, fog, snow, ultraviolet rays, wind, dust, etc.).

While the housing 164 is positioned within the receiving structure 140, the reflective element 162 can be positioned within the ocular system 106 as to be viewable by a user looking through the riflescope 100. Although the embodiments shown in FIGS. 1, 3, and 4A-B illustrate the modular display assembly 138 inserted into a top or uppermost portion of the ocular system 106 of the riflescope 100, the modular display assembly 138 can be positioned at other locations on the riflescope 100. For example, the modular display assembly 138 can be received within a bottom or lower most portion of the ocular system 106, in a side portion of the ocular system 106, within any peripheral portion of the ocular system 106 or in some other section of the riflescope 100 (e.g., the objective system 102 or the main tube 104).

In some embodiments, at least a portion of the modular display assembly 138 can be exposed, visible, or otherwise accessible by a user while the modular display assembly 138 is positioned within the receiving structure 140. For example, one or more buttons, switches, ports (e.g., a universal serial bus port), levers, joysticks, displays, or a combination thereof can be accessible to the user while the modular display assembly 138 is positioned within the receiving structure 140. In some embodiments, as shown in FIG. 4B, the joystick 182 of the user interface 144 can be accessible to the user to provide an input mechanism for modifying an operational setting of the modular display assembly 138 or some other component of the riflescope 100 (e.g., the encoder 154, the reticle 152, etc.).

FIG. 5A shows a perspective view of the modular display assembly 138 of the riflescope 100, according to an embodiment of the present disclosure. FIG. 5B shows another perspective view of the modular display assembly 138 shown in FIG. 5A, according to an embodiment of the present disclosure. FIG. 5C shows an exploded perspective view of the modular display assembly 138 of FIG. 5A, according to an embodiment of the present disclosure. As illustrated in FIGS. 5A-5C, in some embodiments, the modular display assembly 138 can include the control module 142, the user interface 144, the reflective element 162, the housing 164, the seal 184.

The housing 164 can function as a frame or structure supporting one or more of the components of the modular display assembly 138 (including a power source 160). In some embodiments, the housing 164 can include a first housing portion 164a and a second housing portion 164b. The first and second housing portions 164a, 164b can be coupled together, for example, by one or more fasteners 186. By fashioning the housing 164 as two or more distinct portions, one or more of the components of the modular display assembly 138 can be retained between the two or more portions of the housing 164. Moreover, a housing 164 comprising multiple distinct portions can be beneficial in manufacturing and assembling the modular display assembly 138, for example, by reducing a difficulty of machining or manufacturing the housing 164. While the embodiments shown in FIGS. 5A-C illustrate a housing 164 including multiple coupled portions 164a, 164b, this disclosure also conceives of a housing that has a single-piece or monolithic construction.

The housing 164 can include one or more features for retaining the housing 164 within the receiving structure 140. For example, the first housing portion 164a can form one or more recesses or openings 180 for retaining the modular display assembly 138 within the receiving structure 140. Each opening 180 can be formed as a blind-hole or through-hole for receiving a fastener (e.g., setscrew 178). Additionally or alternatively, the housing 164 can form other features capable of retaining the modular display assembly 138 within the receiving structure 140. For example, the housing 164 and/or receiving structure can form one or more threaded through-holes or blind-holes, shelves, recesses, platforms, channels, grooves, splines, apertures, protrusions, or any other feature capable of supporting and/or retaining the housing 164 within the receiving structure 140.

The housing 164 can include one or more features for affixing components to the housing 164. For example, the housing 164 can form one or more threaded through-holes or blind-holes, shelves, recesses, platforms, channels, grooves, splines, apertures, protrusions, or any other feature capable of supporting and/or retaining a component of the modular display assembly 138 to the housing 164. The housing 164 can be made out of any material capable of functioning as described herein, such as metals, metal alloys, plastics, ceramics, and so on. In various embodiments, the housing 164 can be treated or coated in some embodiments. For example, the housing 164 can be painted, anodized, annealed, powder-coated, or otherwise modified to provide a desired characteristic. The housing 164 or portions thereof can be machined using a computer numerical control (CNC) machine, molded using injection molding techniques, stamped using a hydraulic press, or otherwise manufactured using known manufacturing techniques.

The housing 164 can include a groove or channel extending around a periphery of the housing 164. For example, the first housing portion 164a can include a channel 188 that retains the seal 184 around a periphery of the housing 164. The seal 184 can be elastically retained within the channel 188, adhered to an inner surface of the channel 188, or otherwise retained within the channel 188 by compressive forces placed on the seal 184 as a result of the size and/or shape of the channel 188.

The control module 142 can include a display 146 and electronic components (e.g., the processor 148, the memory 150, other electrical circuits, etc.) operably coupled to a substrate 190. In some embodiments, the substrate 190 can be an electrical substrate manufactured as a printed circuit board (PCB) and include electrical traces throughout the substrate 190 to operably couple the electrical components of the control module 142 with other electrical components within the modular display assembly 138. The substrate 190 can have electrical or electro-mechanical instruments, such as capacitors, inductors, resistors, transistors, chip sets, and so on. The electrical or electro-mechanical instruments can make up the various electrical components of the modular display assembly 138 (e.g., the processor 148, the memory 150, etc.) and facilitate the functional aspects of the modular display assembly 138 disclosed herein.

The substrate 190 can be adjustably coupled to the housing 164. For example, the substrate 190 can be adjustably coupled to the second housing portion 164b by inserting fasteners 192 through apertures 194 formed within the housing 164 and coupling the fasteners 192 to a portion of the substrate 190 (e.g., nuts 196). A diameter of the apertures 194 can be oversized (compared to a diameter of the fasteners 192) and thereby permit the movement of the substrate 190 relative to the housing 164 (see FIG. 6 and its associated description herein). Alternatively, the apertures may be formed as elongated slots to provide for a desired level of adjustment as will be further described herein below.

The display 146 can be operably coupled to the substrate 190 and positioned adjacent to the substrate 190. In some embodiments, the display 146 can be positioned such that light emitted from the display 146 is directed toward the reflective element 162. In other words, as depicted in FIGS. 5A-C, the display 146 can be positioned on a surface of the substrate 190 closest to the reflective element 162. In other embodiments, the display 146 can be communicatively coupled to the control module 142, but directly coupled to the housing 164 (as opposed to being physically coupled to the substrate 190). In some embodiments, the display 146 can have an active area (i.e., area that emits light) of less than about 10 mm$^2$, from about 10 mm$^2$ to about 15 mm$^2$, from about 15 mm$^2$ to about 20 mm$^2$, or greater than about 20 mm$^2$. For example, the display 146 can have a rectangular active area having a width of about 3.6 mm and a height of about 3.1 mm.

Excess light within a riflescope can be distracting to the user or otherwise inhibit the user experience by creating light pollution within the riflescope. For example, excess or unwanted light from a display can drown or soften the reticles and thereby negatively impact the user experience. In some embodiments, the modular display assembly 138 can include one or more components that limit or prevent visibility of unwanted or excess display light within the riflescope 100. For example, the modular display assembly 138 can include a shield structure 198 positioned around a periphery of the display 146 such that light emitted from the display 146 can only travel toward the reflective element 162. In other words, the shield structure acts as a barrier to prevent light from illuminating other regions of the riflescope 100 (i.e., regions other than the reflective element 162). Similarly, the collar 200 can also limit or prevent unwanted light emitted the display 146 or another component of the control module 142 from creating light pollution within the riflescope. Additionally, or alternatively, the collar 200 can block the control module 142, the controller 204, a combination thereof, or another component of the riflescope prevent a user of the modular display assembly 138 from being visible to a user while the user is looking through the ocular end of the riflescope.

The reflective element 162 can be any object capable of reflecting or relaying light, emitted from the display 146, through the ocular system 106 of the riflescope 100. The reflective element 162 can define a surface oriented at any number of angles relative to light emitted from the display 146. For example, the reflective element 162 can define a surface oriented at an angle of approximately 35°, 40°, 45°, 50°, 55°, or 60° relative to light emitted from the display 146.

In some embodiments, the reflective element 162 can be a beam splitter or prism which reflects a portion of an image or indicia illuminated on the display 146 to be viewable by the user of the riflescope 100. Portions of the prism or beam splitter can be transparent or semi-transparent when the portions are not reflecting light, such that visibility through the riflescope 100 is not unnecessarily hindered by the reflective element 162. In such embodiments, the reflective element, or at least a portion thereof, may extend downward (as viewed, for example, in FIG. 5A) beyond the lower surface of the associated housing portion 164b. In other embodiments, the reflective element 162 can be a highly polished surface, such as a mirrored surface, capable of reflecting at least a portion of image or indicia formed on the display 146. In such embodiments, the reflective element 162 may occlude a portion of the so-called "live view" (the optical image of a distant scene) presented to the ocular system 106.

Additionally, or alternatively, the reflective element 162 can include a coating or film that reflects a portion of an image or indicia illuminated on the display 146 to be viewable by the user of the riflescope 100. For example, the coating or film can be a metal or metal oxide deposited on one or more surfaces of the reflective element 162. In some embodiments, the coating or film can reflect a particular wavelength or range of wavelengths such that a particular wavelength of range of wavelengths are reflected by the reflective elements 162 while another particular wavelength or range of wavelengths are passed through the reflective element 162.

In some embodiments, the user interface 144 can include one or more input/output (I/O) devices 202 and a controller 204. As previously described herein, the I/O devices 202 can be joysticks, buttons, keys, knobs, touchscreens, displays, speakers, microphones, etc. An example I/O device 202 is shown in FIGS. 5A-C as a joystick 182. The controller 204 can recognize user input at the I/O device 202 and relay the user input to the processor 148 of the control module 142. Like the control module 142, the controller 204 can be manufactured as a printed circuit board (PCB) and include electrical traces throughout the controller 204 to operably couple one or more electrical components of the controller 204 with other electrical components within the modular display assembly 138. The controller 204 can have electrical or electro-mechanical instruments, such as capacitors, inductors, resistors, transistors, chip sets, and so on. The electrical or electro-mechanical instruments can make up the various electrical components of the controller 204 such as a processor, memory, and/or other computing component positioned on the controller 204 and capable of facilitating the operational aspects of the modular display assembly 138 disclosed herein. In some embodiments, the processor, memory, and/or other computing components of the controller 204 can be distinct and individual components from the processor 148, the memory 150, or other components of the control module 142. In other embodiments, the controller 204 utilizes the same processor, memory, and other computing components of the control module 142.

In some embodiments, a spacer or gasket 206 can be positioned between the second housing portion 164b and controller 204. The gasket 206 can be beneficial, for example, the gasket 206 can dampen vibration, reduce wear between the second housing portion 164b and the controller 204, and/or prevent or limit ingress of fluid between the second housing portion 164b and the controller 204. In some embodiments, the 138 can include a fiber optic element 208 which collects light emitted by the display 146 and transfers the collected light to a sensor on the control module 142 which detects the brightness or luminous intensity of the collected light. Based on the sensed intensity of the collected light, the control module 142 can adjust the output of the display 146 to achieve a desirable intensity of the light emitted from the display 146.

Figure 6:
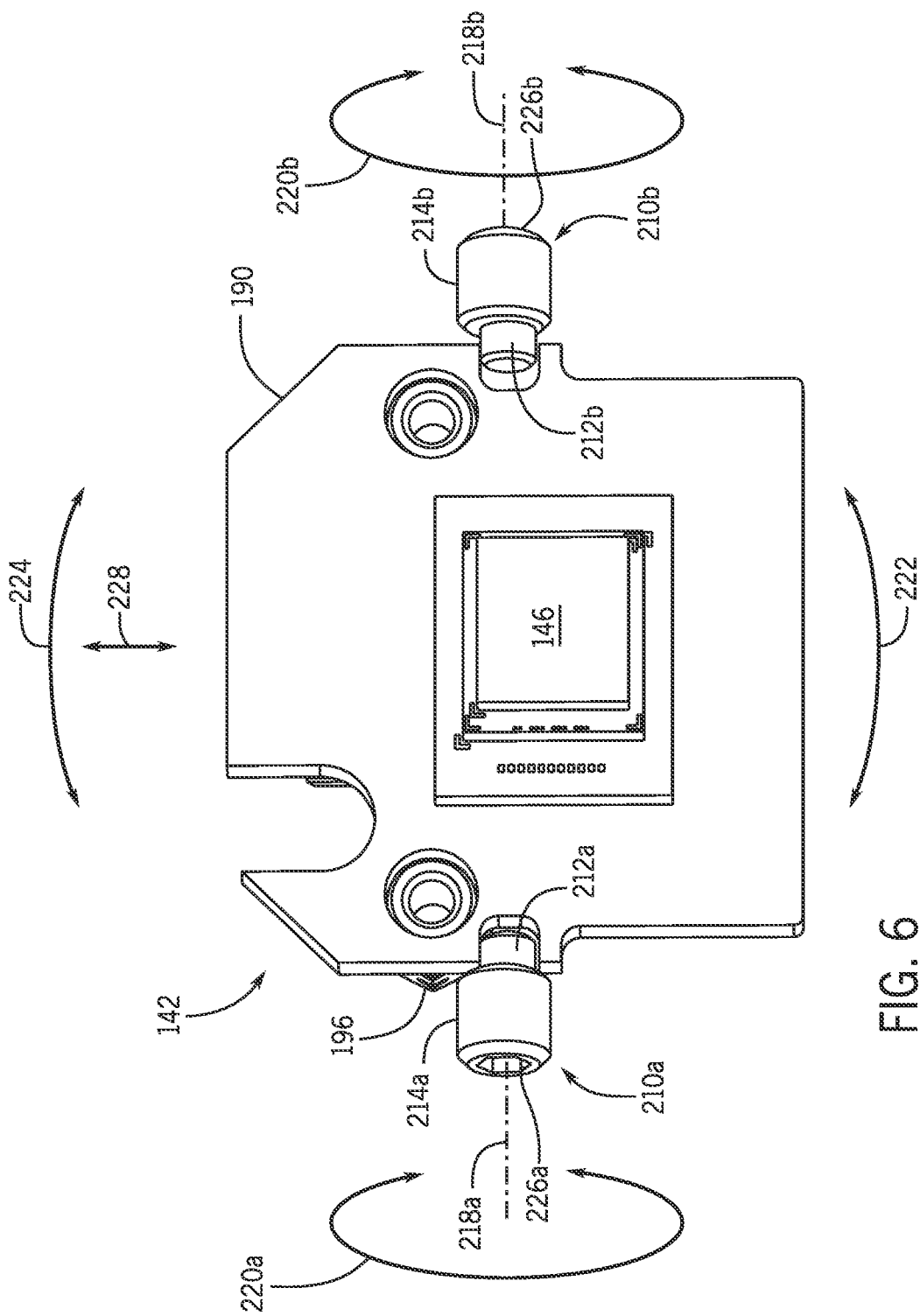
FIG. 6 is a perspective view of a control module of a modular display assembly according to an embodiment of the present disclosure.

FIG. 6 shows a perspective view of the control module 142 of the modular display assembly 138 according to an embodiment of the present disclosure. More specifically, FIG. 6 illustrates the adjustability of the control module 142 relative to the housing 164 (and the associated reflective element 162) by incorporation of one or more alignment pins 210a, 210b. The alignment pins 210a, 210b can each include respective protrusions 212a, 212b and bodies 214a, 214b. The alignment pins 210a, 210b can be received within respective through-holes 216a, 216b formed within the housing 164 (see FIGS. 5A-C).

In some embodiments, the alignment pins 210a, 210b can engage the substrate 190 of the control module 142 to adjust the position of the display 146 relative to the reflective element 162. For example, each of the alignment pins 210a, 210b can include respective protrusions 212a, 212b offset from a longitudinal axis 218a, 218b extending through the center of an associated body 214a, 214b of the alignment pin 210a, 210b. In one embodiment, the axes 218a and 218b are coaxial. The longitudinal axes 218a, 218b extend longitudinally along the radius of the body 214a, 214b of the alignment pins 210a, 210b. Considering alignment pin 210a, the protrusion 212a is axially offset from the longitudinal axis 218a such that the protrusion 212a does not rotate about the protrusion's own volumetric center while the entire alignment pin 210a is rotated about the axis 218a as indicated by directional arrows 220a. Instead, the protrusion 212a rotates non-concentrically about the longitudinal axis 218a. In other words, the longitudinal axis 218a does not intersect or pass through the protrusion's volumetric center. Stated yet another way, a longitudinal axis extending through the center of the protrusion 212a (not shown) may extend parallel to the longitudinal axis 218a of the alignment pin. The other alignment pin (i.e., 210b) may be formed similar to the first alignment pin 210a.

Each of the alignment pins 210a, 210b may include an engagement recess 226a, 226b to accommodate a tool head (e.g., Allen wrenches, screw-drivers, etc.). The engagement recesses 226a, 226b provide a feature on the alignment pins 210a, 210b that enable the user or technician to turn the alignment pins 210a, 210b within their respective through-holes 216a, 216b. When the modular display assembly 138 is positioned within the receiving structure 140, the engagement recesses 226a, 226b may be inaccessible to the user or technician (e.g., covered by the outer casing 174 of the ocular system 106). In other embodiments, outer surfaces of the bodies 214a and 214b may be configured for operation by a tool (or by a user's hand or fingers) rather than having a recess formed in the body.

When the alignment pin 210a is rotated about its axis 218a, as indicated by directional line 220a, the protrusion 212a eccentrically rotates about the same axis 218a and may extend between two extreme positions in a direction parallel to that indicated by directional arrow 228. Because the protrusion is position within a recess or opening formed on the substrate 190, eccentric rotation of the protrusion 212a causes the substrate 190 to be displaced relative to the housing 164. For example, rotation of a single alignment pin 210a or 210b about its associated axis effects a displacement of the substrate (and components coupled therewith, such as the display 146) as indicated by directional line 222 illustrated in FIG. 6. Coordinated rotation of both pins 210a and 210b can result in the translation of the substrate 190 relative to the housing 164 in a direction substantially parallel to directional arrow 228 (which is also substantially perpendicular to the longitudinal axes (and axes of rotation) 218a and 218b of the alignment pins 210a and 21b. For example, this may occur if the respective protrusions 212a, 212b are aligned on the same axis (i.e., the position of protrusion 212a is mirrored by protrusion 212b), and one of the alignment pins is rotated counter-clockwise and the other alignment pin is rotated clockwise by an equivalent amount.

The alignment pins 210a, 210b enable the user or technician to adjust the position of the substrate 190 relative to the housing 164. Thus, any component coupled to the substrate 190 can also be moved relative to the housing 164. This adjustability is beneficial in providing a method for aligning various components of the modular display assembly 138. For example, if the display 146 is coupled to the substrate 190, the display 146 can be aligned with the reflective element 162, which is coupled to the housing 164, by rotation of the alignment pins 210a and/or 210b to ensure that light emitted from the display 146 is appropriately reflected by the reflective element 162. A user can, therefore, adjust the position of the display 146 so as to provide a centered and horizontally levelled image or indicia reflected by the reflective element 162. Variants of the embodiment shown in FIG. 6 are also contemplated within this disclosure. For example, the substrate 190 can be shifted using threaded fasteners threadably coupled to two or more sides of the housing, wherein the substrate 190 is shifted when one or more of the threaded fasteners are rotated. Additionally, or alternatively, such an alignment mechanism may be associated with the reflecting element 162, enabling the repositioning of the reflecting element 162 relative to the display 146.

Figure 7:
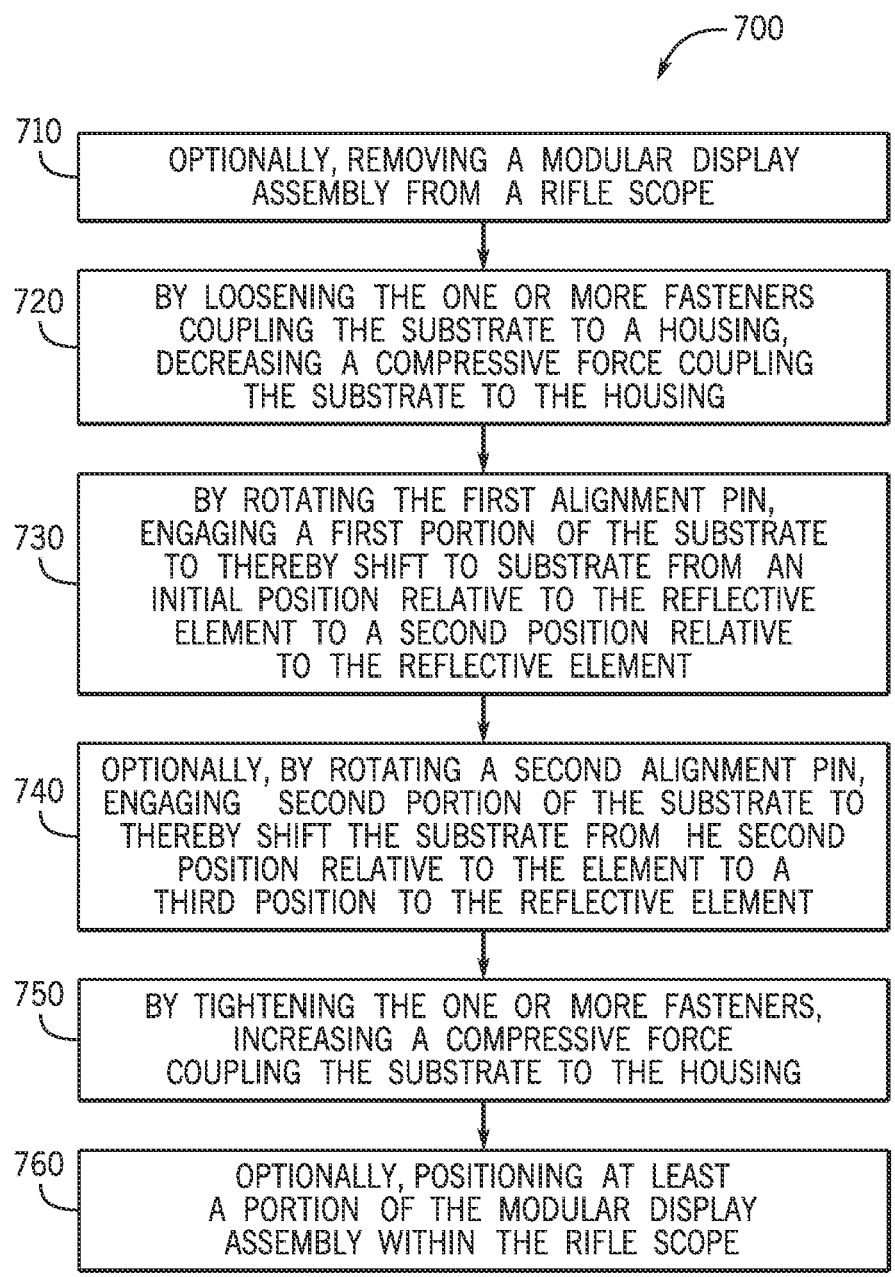
FIG. 7 is a flow diagram of a method for aligning components of a riflescope, according to at least some embodiments.

FIG. 7 shows a flow diagram of a method 700 for aligning components of a riflescope, according to at least some embodiments. The method 700 can include the act 710 of removing a modular display assembly from a riflescope. The modular display assembly including a housing, a first alignment pin, a second alignment pin, a control module, and a reflective element. The control module can include a substrate coupled to the housing by one or more fasteners. The control module can include a display coupled to the substrate. The first and second alignment pins can be positioned within respective through-holes formed in the housing. The reflective element can be coupled to the housing. Any of the components within method 700 can have the described functionality, sub-components, and characteristics of the components previously described herein and shown in the embodiments illustrated in FIGS. 1, 3, 4A-B, 5A-C, and 6. For example, the control module of method 700 can have the same functionality, sub-components, and characteristics as the control module 142.

The method 700 can include the act 720 of, by loosening the one or more fasteners coupling the substrate to a housing, decreasing a compressive force coupling the substrate to the housing. The one or more fasteners can be operably coupled to a receiving element (e.g., one or more nuts) on the substrate such that rotating the fastener in a first direction decreases the compressive force on the substrate (i.e., the substrate is compressively held between the nut and the housing).

The method 700 can include the act 730 of, by rotating the first alignment pin, engaging a first portion of the substrate to thereby shift the substrate from an initial position relative to the reflective element to a second position relative to the reflective element. The method 700 can include the act 730 of, by rotating a second alignment pin, engaging a second portion of the substrate to thereby shift the substrate from the second position relative to the reflective element to a third position relative to the reflective element.

The method 700 can include the act 750 of, by tightening the one or more fasteners, increasing a compressive force coupling the substrate to the housing. The method 700 can include the act 760 of positioning at least a portion of the modular display assembly within the riflescope. Accordingly, the method 700 may align components of a riflescope (e.g., repositioning the substrate relative to the reflective element on the housing). The method 700 may include more or fewer acts than the acts 710-760. For example, the method 700 may not include the act 710, act 740, or the act 760.

Figure 8:
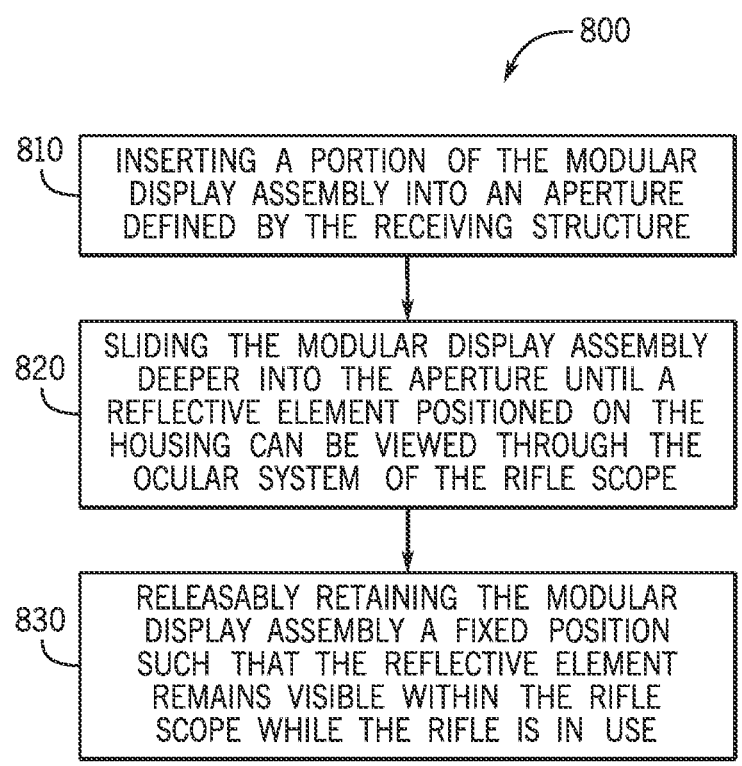
FIG. 8 is a flow diagram of a method for assembling a modular display assembly into a riflescope, according to at least some embodiments.

FIG. 8 shows a flow diagram of a method for inserting a modular display assembly into a riflescope 100, according to at least some embodiments. The method 800 can include the act 810 of aligning the modular display assembly with a receiving structure of the riflescope. The receiving structure can be formed on an ocular system of the riflescope. The receiving structure can include one or more features, such as walls extending from an outer casing of the ocular system. Any of the components within method 800 can have the described functionality, sub-components, and characteristics of the components previously described herein and shown in the embodiments illustrated in FIGS. 1, 3, 4A-B, 5A-C, and 6. For example, the modular display assembly of method 800 can have the same functionality, sub-components, and characteristics as the modular display assembly 138.

The method 800 can include the act 810 of inserting a portion of the modular display assembly into an aperture defined by the receiving structure. The aperture can be substantially equivalent in size and shape to a footprint or cross-section of the modular display assembly, such that a housing of the modular display assembly is at least partially receivable within the aperture. The method 800 can include the act 820 of sliding the modular display assembly deeper into the aperture until a reflective element positioned on the housing can be viewed through the ocular system of the riflescope.

The method 800 can include the act 830 of releasably retaining the modular display assembly at a fixed position such that the reflective element remains visible within the riflescope while the rifle is in use. Accordingly, the method 800 may provide for insertion of a modular display assembly within a riflescope. The method 800 may include more or fewer acts than the acts 810-830.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A riflescope comprising:
a main tube;
an ocular system coupled to a first end of the main tube, the ocular system including a receiving structure and an eyepiece lens, the receiving structure defining an aperture between the eyepiece lens and the main tube;
an objective system coupled to a second end of the main tube, the main tube, the objective system, and the ocular system defining at least one focal plane; and
a modular display assembly comprising:
a housing;
a control module operably coupled to the housing, the control module comprising:
a substrate; and
a display configured to emit light;
a user interface configured to receive input; and
a reflective element positioned between the focal plane and the ocular system, the reflective element being configured to reflect at least a portion of light emitted from the display;
wherein the modular display assembly is configured to be releasably retained within the aperture of the receiving structure.

2. The riflescope of claim 1, wherein input received at the user interface varies an indicia defined by the light emitted from the display.

3. The riflescope of claim 1, further comprising a reticle having a horizontal marking defining a plane that bisects the riflescope, wherein the reflective element is positioned on one side of the plane.

4. The riflescope of claim 1, further comprising a processor and memory, the processor being in electric communication with the display.

5. The riflescope of claim 1, wherein the display is at least one of a liquid crystal display (LCD), light-emitting diodes (LED), quantum light-emitting diodes (QLED), organic light-emitting diodes (OLED) an e-ink display, a plasma display, a segment display, an electroluminescent display, a surface-conduction electron-emitter display, or a quantum dot display.

6. The riflescope of claim 1, further comprising a power source, wherein the power source is configured to provide electrical power to at least the modular display assembly.

7. The riflescope of claim 1, further comprising a seal positioned between the modular display assembly and the riflescope, the seal being configured to prevent ingress of contaminants into the riflescope.

8. The riflescope of claim 1, further comprising a set of alignment pins, the set of alignment pins engaging the substrate, wherein rotation of each alignment pin of the set of alignment pins causes the substrate to move relative to the reflective element.

9. A modular display assembly for a riflescope, the modular display assembly comprising:
a housing;
a control module operably coupled to the housing, the control module comprising:
a substrate; and
a display configured to emit light;
a user interface; and
a reflective element configured to reflect, through an eyepiece lens of the riflescope, at least a portion of light emitted from the display;
wherein at least a portion of the housing is configured to be removably inserted into the riflescope.

10. The modular display assembly of claim 9, wherein:
the user interface comprises an input/output device at least partially positioned within an opening formed within the housing;
the user interface comprises a controller operably coupled to the input/output device, the controller being configured to recognize an input received at the input/output device; and
the input received at the input/output device varies a displayed content defined by the light emitted from the display.

11. The modular display assembly of claim 9, wherein the input/output device includes at least one of a joystick, button, switch, or knob.

12. The modular display assembly of claim 10, wherein the control module further includes a processor and memory storage having a plurality of operational programs stored therein, the processor being configured to execute the plurality of operational programs when the input is received at the input/output device.

13. The modular display assembly of claim 9, wherein the housing includes a first housing portion and a second housing portion, the first housing portion and the second housing portion being separable.

14. The modular display assembly of claim 9, wherein the modular display assembly is removable from the riflescope.

15. The modular display assembly of claim 9, wherein the substrate includes a printed circuit board configured to communicatively couple the display to a processor.

16. The modular display assembly of claim 9, further comprising a seal positioned adjacent the housing.

17. The modular display assembly of claim 9, wherein the reflective element is a mirror or prism having a surface oriented at an angle of approximately 45° relative to light emitted from the display.

18. The modular display assembly of claim 9, further comprising a set of alignment pins, the set of alignment pins extending into the housing and engaging the substrate, wherein rotation of each alignment pin of the set of alignment pins causes the substrate to move relative to the reflective element.

19. The modular display assembly of claim 9, wherein light emitted from the display forms an indicia defining information.

20. A riflescope comprising:
a main tube;
an ocular system coupled to a first end of the main tube, the ocular system including an eyepiece lens and an outer casing defining a cavity within the ocular system;
an objective system coupled to a second end of the main tube, the main tube, objective system, and ocular system defining at least one focal plane;
a modular display assembly comprising:
  a housing;
  a control module operably coupled to the housing, the control module having a processor;
  a display communicatively coupled to the processor, the display being configured to emit light forming indicia; and
  a user interface configured to receive input;
wherein the modular display assembly is configured to be received within an aperture formed within the outer casing of the ocular system at a location distal to the eyepiece lens; and
wherein at least a portion of the modular display assembly extends into the cavity when the display assembly is received within the aperture.

* * * * *